July 3, 1945. W. E. GILSON 2,379,573
AUTOMATIC BLOOD PRESSURE RECORDER
Filed Aug. 17, 1942 2 Sheets-Sheet 2

Inventor
Warren E. Gilson
By George I. Haight
Atty.

Patented July 3, 1945

2,379,573

UNITED STATES PATENT OFFICE 2,379,573

AUTOMATIC BLOOD PRESSURE RECORDER

Warren E. Gilson, Madison, Wis., assignor to Wisconsin Alumni Research Foundation, Madison, Wis., a corporation of Wisconsin Application August 17, 1942, Serial No. 455,139

6 Claims. (Cl. 128—2.05)

My invention relates to improvements in means for the determination of blood pressure, and the primary object of my invention is to automatically determine and record blood pressure at predetermined intervals without manual intervention.

A further object is to minimize discomfort to the patient by suddenly and automatically relieving the patient of cuff pressure between periods of blood pressure determinations.

A further object is to provide an accurate simultaneous record of the cuff pressure and the sounds produced by the excursion of the artery walls, which indicate the blood pressures in relation to the cuff pressure.

These and other objects of my invention are accomplished by the provision of recording means responsive to pressure and sound, and automatically timed to operate at regular intervals.

Referring to the accompanying drawings which illustrate one embodiment of my invention, Fig. 1 is a view illustrating diagrammatically the various mechanisms or instrumentalities for recording pressures and sounds, together with the circuit for controlling the operation and timing of these mechanisms;

Figure 1:
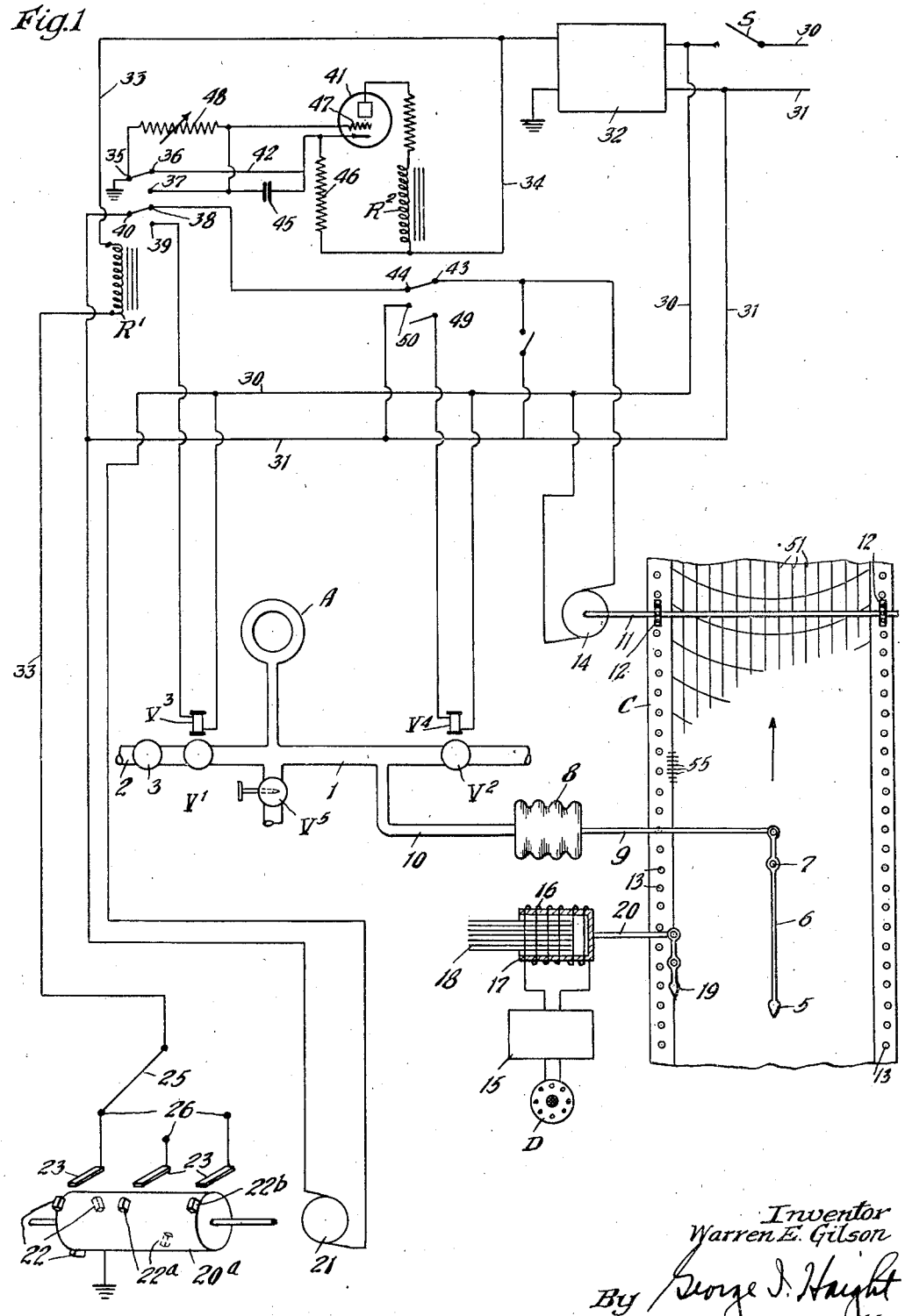

The device is provided with an inflatable cuff A of the usual type, which is applied to the patient's arm and which is connected to an air line 1. This air line is connected at its end 2 to a suitable source of compressed air, and at its other end it is open to the atmosphere. A manually operated pressure reducing valve 3 is provided in the line for regulating the maximum desired pressure admitted to the cuff, this pressure being adjusted to a pressure well above the systolic blood pressure of the patient. On each side of the cuff connection is a suitable valve. The valve $V^1$, when open, admits air pressure to the inflatable cuff; and the valve $V^2$, when open, exhausts air from the cuff to the atmosphere to completely deflate the cuff. These valves are operated by electromagnets $V^3$ and $V^4$, respectively, and are controlled as hereinafter described. A bleeder valve $V^5$, preferably in the form of a manually adjustable needle valve, is connected in the line between the valves $V^1$ and $V^2$ for the purpose of gradually reducing air pressure in the cuff from above the systolic blood pressure to a point below the diastolic blood pressure, during which period of pressure reduction the blood pressure is indicated, as is well understood in the art.

The cuff pressure is recorded by a suitable recording mechanism. In the drawing, this recording mechanism consists of a moving chart C upon which a record is marked by a pen 5 carried on an arm 6 which is pivoted at 7 above the chart. The pen marker is actuated by a bellows 8 which is connected by a link 9 to the other end of the pen marker so as to swing the pen marker in an arc across the chart.

The bellows is connected by an air line 10 to the air line 1 between the two valves $V^1$ and $V^2$, so that it will be responsive to the pressure in the cuff. The chart consists of a continuous strip or band of paper which is moved longitudinally of itself by a shaft 11 having toothed wheels 12 which engage perforations 13 along the margins of the sheet. The shaft 11 is driven by a suitable motor 14 which is controlled, as hereinafter described, to start and stop the movement of the chart as required.

The device is also provided with a sound-detecting means which likewise records the sounds upon the chart. This sound recorder may be of any suitable construction for the purpose. In the present case, it comprises a microphone or stethophone D of the type usually used, to be applied to the patient's arm adjacent the cuff to pick up the blood pressure sounds resulting from the excursion of the arterial walls when the cuff is inflated. The microphone operates through a suitable amplifier 15 to energize a coil 16 carried upon a brass cylinder 17 within which is positioned a permanent magnet 18. The cylinder is movable longitudinally of itself in response to the current impulses in the coil set up by the microphone, and these movements are transmitted to a pen marker 19 by the connecting link 20. The pen marker 19 is pivoted adjacent the margin of the chart and marks the coil movements representing the sound impulses as short, transverse lines along the margin of the chart.

The mechanisms described are all controlled automatically so that blood pressure can be taken at intervals over any extended period of time. The interval at which the blood pressure is to be recorded is determined by a multiple contact timing device. This consists of a cylinder 20ª which is rotated by a suitable synchronous motor 21, preferably at the rate of one revolution a minute. This cylinder carries several series of raised contacts—in the present case three series—which close a circuit to bring about the inflation of the cuff at the desired intervals. The contacts 22 for 20-second intervals are three in number and are placed 120° apart on the cylinder; the contacts 22ª for the 30-second intervals are two in number and are placed 180° apart on the cylinder; and the contact 22ᵇ for the 1-minute intervals is a single contact. A brush 23 is provided for engaging these contacts in each of the series.

A selector switch 25 is provided, having a series of contacts 26 connected to the brushes 23, so that the operator, by setting the switch at any one of the contacts 26, can select the intervals at which the blood pressures are to be recorded. The contacts 22, 22$^a$, and 22$^b$ are of such length that as the cylinder rotates, the duration of engagement by the brushes 23 will be preferably four seconds, during which period the valve V$^1$ is opened to admit air pressure to the cuff to inflate the cuff.

The source of power for operating the timer motor 21, chart motor 14, and the valves V$^1$ and V$^2$, is represented by the line conductors 30 and 31, and the power supply for the relays and the electronic tube 41 is connected to this source of power and is conventionally indicated at 32. A main switch S is provided in the main line for starting and stopping the apparatus. Upon the closure of the main switch S, the timer motor 21 for cylinder 20$^a$ is started in rotation. The closure of the switch S also applies voltage from the power supply over conductor 34, relay R$^2$, thyratron electronic tube 41, conductor 42, to ground through contacts 35 and 36 of relay R$^1$. The thyratron tube breaks down and allows current to flow in this circuit, which current energizes relay R$^2$ which opens the circuit of the chart motor 14 by separating the relay contacts 43—44, thereby stopping the chart motor or preventing it from running. Since the timer motor 21 and the contact cylinder 20$^a$ have started rotating, the cylinder contacts are brought into contact with the brushes 23 which close a circuit to ground from the power supply 32 over conductor 33, which circuit includes relay R$^1$ and the previously selected interval contact on the cylinder. The energization of relay R$^1$ closes relay contacts 40 and 39, and closes a circuit which energizes valve magnet V$^3$ of valve V$^1$. The valve V$^1$ is thereby opened to admit air under pressure to the inflatable cuff 2. This valve remains open for the period of engagement of the brush 23 with the cylinder contact which, in the present instance, is four seconds, as before mentioned. The pressure reached in the cuff is determined by the manually operated pressure reducing valve 3.

At the end of the 4-second period, the cylinder contact leaves the brush 23 and opens the circuit, thus deenergizing relays R$^1$ and restoring the movable contacts 35 and 40 to their initial positions in engagement with contacts 36 and 37, respectively, by virtue of springs or gravity, as well understood in connection with relays of this type, thus opening the relay contacts 35 and 37 and closing the contacts 35 and 36. The relay contacts 35 and 36 were separated during the 4-second inflation of the cuff, and the circuit through the thyratron tube 41 was interrupted. This de-energized relay R$^2$ and restored the movable contact 43 to its initial position in engagement with contact 44 and movable contact 49 to its initial position out of engagement with contact 50, by virtue of springs or gravity, as well understood in connection with relays of this type. The de-energization of relay R$^2$ brought together contacts 43 and 44 and separated contacts 49 and 50, thus de-energizing the operating magnet V$^4$ of valve V$^2$ so that the valve V$^2$ remained closed.

When the relay contacts 35 and 37 were closed during the inflation of the cuff, a circuit was closed which included a 3-microfarad condenser 45 which caused the condenser to charge to about 150 volts through a 100,000 ohm bleeder 46, so that upon the restoration of contacts 35 and 36 upon the de-energization of relay R$^1$, the thyratron does not break down immediately because of the negative 150-volt charge applied by the condenser 45 to the grid 47 of the thyratron; instead, this charge gradually leaks through the 3 megohm variable resistor 48 which is bridged to ground across the condenser, and when the negative potential has decreased to about 6 volts the tube breaks down and allows current to flow in the circuit which includes the relay R$^2$. When the relay R$^1$ was de-energized at the end of the 4-second period of inflation, the closing of relay contacts 40 and 38 completed the circuit for the chart motor 14 and started the movement of the chart C, relay R$^2$ having become de-energized and permitting contacts 43 and 44 to close.

After the cuff has been inflated to a pressure well above the systolic blood pressure and the valve V$^2$ closed, the air begins to leak out of the line and cuff through the adjustable bleeder valve V$^5$. This gradually reduces the pressure in the cuff to a point below the diastolic blood pressure, the time occupied in reducing the pressure being regulated by adjusting the bleeder valve V$^5$ accordingly. After the cuff pressure thus has been reduced below the diastolic blood pressure, it is then desirable to completely deflate the cuff of the remaining pressure before the next cycle of operation, and this is brought about by the 3 megohm variable resistor 48, above described, which serves as a timing device. By adjusting the resistor the discharge of the condenser can be regulated to occupy any desired period of time in relation to the reduction of pressure in the cuff. If the blood pressure is to be taken periodically at 30-second intervals, for instance, it is desirable to provide a rest period of say ten seconds during which the cuff pressure can be completely exhausted and the patient relieved of the discomfiture of cuff pressure until the next cycle of operation. Thus to allow a 10-second rest period before the next operation, the variable resistor 48 can accordingly be adjusted to time the discharge of the condenser and bring about the breakdown of the thyratron tube at the end of a 20-second period.

As before stated, when the thyratron breaks down and again allows current to flow through relay R$^2$, the energization of the relay R$^2$ closes contacts 49 and 50, and this closes the circuit for the operating magnet V$^4$ of valve V$^2$. Valve V$^2$ is thus opened and allows the remaining pressure in the cuff to quickly or suddenly exhaust to the atmosphere and thus completely deflate the cuff. The opening of the relay contacts 43 and 44 also opens the chart motor circuit and stops the movement of the chart C.

The cycle of operations is repeated when the next contact in the selected series on the rotating cylinder 20$^a$ engages the brush 23. The mechanism continues its interval operation for any desired length of time until stopped by opening the main switch S.

Figure 2:
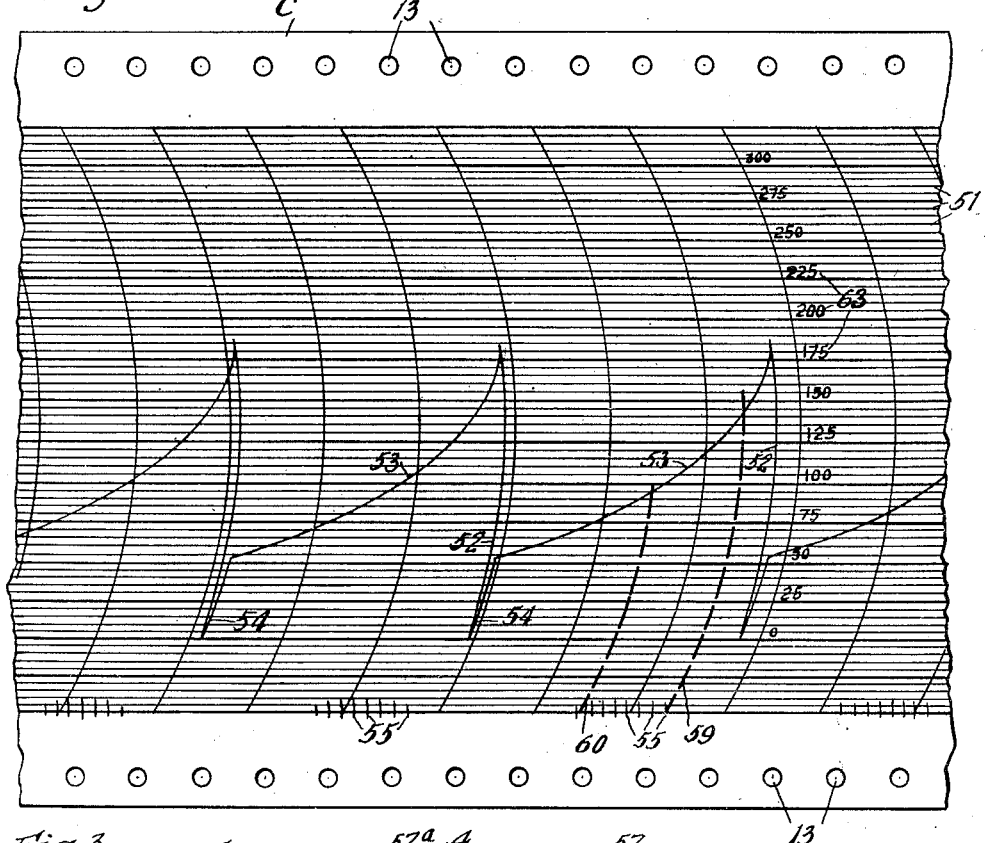
Fig. 2 is an enlarged view of a portion of the moving record chart showing the manner in which the records are marked upon the chart.
Figure 3:
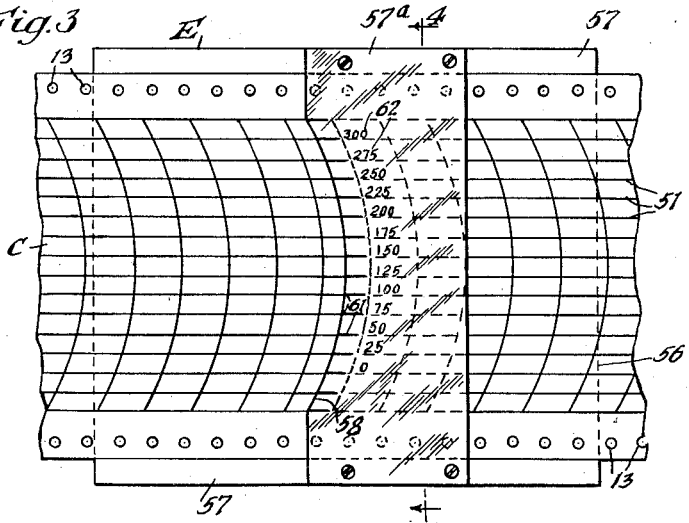
Fig. 3 is a view of the arcuate device used in connection with the chart record for reading the recorded pressures.

Referring now to Figs. 2 and 3, it will be observed that the chart C is provided with a series of longitudinal lines 51 which serve as calibrations for a series of figures representing pressure from 0 to 325 mm. Hg. The pen marker 5 makes a continuous curve or record on the chart, in response to the pressure conditions in the cuff. The portion 52 of the curve represents the increase in pressure during the inflation of the cuff and while the chart is not moving; the portion 53 of the curve represents the gradual reduction in pressure in the cuff, this line being made while the chart is moving; and the portion 54 of the curve represents the sudden and quick deflation of the cuff after the pressure has been reduced to a point below the diastolic pressure.

Figure 4:
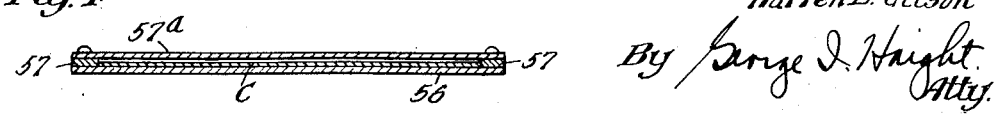
Fig. 4 is a transverse sectional view on the line 4—4 of Fig. 3.

The blood pressure sounds are indicated by the marks 55 along the margin of the chart and are produced by the sounds resulting from the relationship between the cuff pressure and the blood pressure during the period when the pressure is being reduced in the cuff from above systolic to below diastolic blood pressure. In order to read the blood pressure from this record a separate device E, Figs. 3 and 4. is used. This device E comprises a flat base plate 56 having guide rails 57 between which the chart, after it has been removed from the recorder, is moved and guided. This plate is bridged by a piece of transparent material 57a such as celluloid, and spaced above the plate sufficiently so that the chart can be easily moved along the base plate. The edge or margin 58 of the member 57a is arcuate, the arc of which corresponds to the arc of movement described by the pen marker. To read the record, the chart is shifted until its arcuate edge 58 intersects the portion 53 of the pressure curve and the sound marks on the margin of the chart. For instance, the curved broken line 59 representing the arc of the member E is shown on Fig. 2 as intersecting the first of a series of blood pressure sound marks 55 and the portion 53 of the pressure curve. This latter intersection indicates the systolic blood pressure. Likewise, the curved line 60 intersects the last of blood pressure sound marks and the portion 53 of the pressure curve, and indicates the diastolic pressure. For convenience in reading the record, the arcuate margin 58 is provided with a series of calibrations 61 which register with the lines 51 on the chart. Adjacent the arcuate margin 58, the celluloid member 57a has a series of figures 62 representing the pressure corresponding to the calibration lines on the chart. In addition to this, the chart itself may have a series of corresponding figures 63 distributed along at intervals.

I claim:

1. In a blood pressure recorder, the combination of an inflatable arm cuff, means for periodically inflating the cuff to a pressure above the systolic blood pressure, a valve for providing a leak to gradually reduce the cuff pressure, means for suddenly deflating the cuff, a timing device controlling the cuff-deflating means to deflate the cuff after the cuff pressure has been reduced below the diastolic blood pressure and prior to the next cuff inflation to provide rest periods for the patient, said timing device including an electric circuit having therein a relay for controlling said cuff-deflating means and having therein an electronic tube controlling said relay, and means for determining the time of operation of said electronic tube.

2. In an automatic blood pressure recording device, the combination of an inflatable arm cuff and a source of compressed air therefor, means for periodically admitting air pressure to said cuff to inflate the cuff at predetermined intervals, means for gradually reducing the pressure in said cuff, means for quickly deflating said cuff of the remaining pressure prior to each next inflation of the cuff, and electrically operated means for controlling the operation of said cuff-inflating means and said deflating means, said electrical means including an electronic tube and an adjustable resistor for timing the operation of said tube.

3. In an automatic blood pressure indicator, the combination of an inflatable arm cuff, a source of compressed air therefor, an electromagnetically operated valve for admitting air pressure to said cuff to inflate the cuff to a pressure above the systolic blood pressure, a second electromagnetically operated valve for exhausting said cuff of air pressure below the diastolic blood pressure, a bleeder valve for gradually reducing the cuff pressure to a point below the diastolic blood pressure, a circuit controller for periodically energizing said first electromagnetic valve to inflate the cuff at regular intervals, an electronic tube for controlling the operation of said second electromagnetic valve to exhaust the cuff, and means for delaying the operation of said electronic tube for a portion of the time period between the cuff inflations.

4. In an automatic blood pressure indicator, the combination of an inflatable arm cuff, a source of compressed air, an electromagnetic valve for admitting air pressure to said cuff to inflate the cuff, a second electromagnetic valve for exhausting the pressure from said cuff, an electronic tube for controlling the operation of said second electromagnetic valve, a controller for periodically energizing said first electromagnetic valve and said electronic tubes at regular intervals, and an adjustable resistor for delaying the operation of said electronic tube after each energization thereof.

5. In an automatic blood pressure indicator, the combination of an inflatable arm cuff, means including an electromagnetically operated valve for periodically inflating the cuff at regular intervals to a pressure above the systolic blood pressure, a valve for providing a leak to gradually reduce the blood pressure, means for suddenly deflating the cuff, a timing device controlling the cuff deflating means to deflate the cuff after the cuff pressure has been reduced below the diastolic blood pressure and prior to the next cuff inflation to provide rest periods for the patient, said timing device including an electric circuit having therein a relay for controlling said cuff deflating means and having therein an electronic tube controlling said relay, and an adjustable resistor for regulating the time of operation of said electronic tube after each cuff inflation.

6. In an automatic blood pressure indicator, the combination of an inflatable arm cuff and a source of compressed air therefor, an electromagnetically operated valve for admitting air pressure to said cuff to inflate the cuff, means for gradually reducing the pressure in said cuff, and a second electromagnetically operated valve for quickly deflating said cuff of remaining pressure prior to each next inflation of the cuff, an electrically operated means for controlling the operation of said first and second electromagnetically operated valves, said electrical means including an electronic tube, an adjustable resistor for timing the operation of said tube, and a controller for periodically energizing said first electromagnetic valve and said tube at regular intervals.

WARREN E. GILSON.